United States Patent [19]

Dahlgren

[11] Patent Number: 5,261,993
[45] Date of Patent: Nov. 16, 1993

[54] MEANS FOR BONDING SHAPED PARTS OF COMPOSITES OR OTHER MATERIALS

[75] Inventor: William R. Dahlgren, Palos Verdes Estates, Calif.

[73] Assignee: Airtech International Inc., Carson, Calif.

[21] Appl. No.: 894,949

[22] Filed: Jun. 8, 1992

[51] Int. Cl.⁵ .................................. B32B 31/20
[52] U.S. Cl. ........................ 156/382; 156/87; 156/286
[58] Field of Search ............... 156/87, 286, 382; 264/102, 257

[56] References Cited

U.S. PATENT DOCUMENTS

| | | | |
|---|---|---|---|
| 3,493,451 | 2/1970 | Beery | 156/286 |
| 4,311,661 | 1/1982 | Palmer | 264/257 |
| 4,919,744 | 4/1990 | Newman | 156/87 |

Primary Examiner—Caleb Weston
Attorney, Agent, or Firm—John H. Crowe

[57] ABSTRACT

A resilient pad of intertwined nylon fibers of minute cross-sectional diameter having minute interstices throughout. The pad serves as a breather for the curing of a part of composite resinous material for which purpose it is placed over the part, which part is, in turn, fitted onto a shaped tool. To effectuate curing of the part, the part and breather pad are covered by a vacuum bag which is, in turn, sealed around its edges to the shaped tool and provided with a vacuum outlet. The whole assembly is then placed in an autoclave, wherein it is subjected to heat and pressure while vacuum is applied to the vacuum bag to evacuate air and volatile effluents from the part through the breather pad while the part is being cured under the influence of heat and pressure.

6 Claims, 1 Drawing Sheet

MEANS FOR BONDING SHAPED PARTS OF COMPOSITES OR OTHER MATERIALS

BACKGROUND OF THE INVENTION

1. Field of the Invention

This invention relates to the manufacture of parts, such as, for example, aircraft, boat and automobile panels, embodying resins and/or adhesive materials.

2. Description of the Prior Art

The curing of shaped composite parts comprising fibers such as graphite or Kevlar fibers impregnated with thermosetting resins or the bonding of thin metallic or metallic and resinous laminates with thermosetting adhesives is recognized as an effective method of manufacturing lightweight, high strength panels, etc.

In carrying out such procedures with composites, the involved part is placed on a shaped tool or mold in an uncured and somewhat pliant state. A relatively high degree of temperature and pressure is then applied thereto to remove air, moisture and volatiles from the material during the forming and curing operation.

In bonding thin laminates of metal or metal and a composite material together, a thermosetting adhesive is sandwiched between them and they are likewise placed on a shaped tool and subjected to a high degree of temperature and pressure to remove the air, volatiles, etc. therefrom during the forming and bonding operation.

The bonding of shaped parts is generally accomplished by placing the materials to be bonded on a shaped tool and covering them with a flexible porous breather pad after which a vacuum bag is placed thereover and secured to the tool. This assembly is then heated in an autoclave while vacuum is pulled on it to withdraw air and volatiles from the bag and resinous material and from any adhesive present during the curing phase and to impress the part being formed against the tool. The breather pad enables vacuum to be pulled uniformly on all areas of the part and/or the adhesive. The autoclave is pressurized during this procedure to help force the part to intimately fit the contour of the tool and to aid in removing the air, volatiles, etc. therefrom.

Heretofore, breather pads have been formed of intertwined fibers of polyester material and have been generally satisfactory when the curing temperatures were held to little more than about 300° F. However, as composite materials and adhesives of improved strength and other desirable qualities were developed they were found to require higher curing temperatures than this, as well as higher than the conventional forming pressures then employed. This caused the polyester fibers of the breather pad to soften and compact or even fuse together thus closing the interstices between the intertwined fibers and preventing uniform evacuation of volatiles, etc., from all areas of the material being treated as well as any adhesive present. Accordingly, the resulting part instead of being formed into a solid dense structure would tend to contain zones of weakened structural integrity.

SUMMARY OF THE INVENTION

A principal object of the present invention is therefore to provide a breather pad of the above-described type which will withstand higher temperatures and pressures than conventional polyester pads can without significant degradation of its properties.

Another object is to provide such a breather pad which will retain its porosity under significantly higher temperatures and pressures than possible with polyester breather pads.

Still another object is to provide such a breather pad in which the fibers retain their resiliency under higher pressures and temperatures than heretofore possible with polyester pads.

A further object is to provide such a breather pad having a highly uniform porosity throughout.

I have discovered that the use of nylon fibers in lieu of polyester fibers has resulted in an improved breather pad that will withstand considerably greater temperatures and pressures than conventional polyester pads can without significant degradation of the porosity and resiliency of the pad.

I've discovered, also, that certain suitable fibrous materials, such as fiberglass or polyester fibers can be admixed with the nylon fibers without undue loss of temperature or pressure tolerance in the resulting pad. Such mixtures can, for example, include up to 49 percent by weight of the non-nylon fibers.

Tests have shown that my improved breather pad can safely withstand temperatures of at least 450° F. and autoclave pressures of up to 200 psi without significant affect on its porosity or resiliency. In this respect, it should be noted that the vicat softening point of nylon, i.e., the point at which it begins to soften, is only 5° F. below its melting point of approximately 485° F., whereas polyester has a vicat softening point of approximately 305° F. which makes it unsuitable for working at temperatures of 350° F. or higher.

BRIEF DESCRIPTION OF THE DRAWING

The manner in which the above and other objects of the invention are accomplished will be readily understood from the present specification considered in conjunction with the accompanying drawing, wherein.

DESCRIPTION OF THE PREFERRED EMBODIMENT

Figure 1:
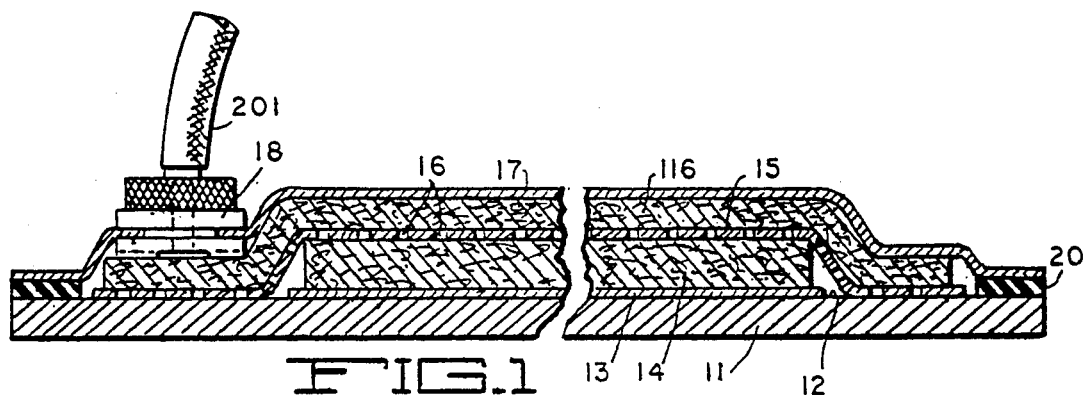
FIG. 1 is an enlarged cross sectional view, partly broken away, showing an uncured part of composite resinous material mounted on a forming tool and surmounted by my improved breather pad preparatory to a curing operation in an autoclave.

Referring to FIG. 1 of the drawing, a rigid forming tool or mold 11 is shown which may be of metal, fiberglass or other suitably rigid material capable of withstanding relatively high temperatures and having a surface 12 contoured in accordance with the desired shape of a structural part to be formed thereon.

A thin film 13 of a release agent of any well-known type, normally in the form of a liquid or paste having nonadhesive qualities, overlies the tool surface 12. This is surmounted by an uncured part 14 which can be of any suitable thickness. The part 14 is a composite formed from a thermosetting resin and strengthening fibers of graphite, ceramic or like temperature stable material. In its uncured state, the part 14 is pliant and can thus be shaped to fit the contour of the tool surface 12.

A release film 15 having a number of small perforations 16 is fitted over the part 14. This film 15 may be formed of any well-known type having nonadhesive qualities, preferably on the order of 0.0005 to 0.002 inch thick.

According to the present invention, a breather pad 116, to be described in detail hereinafter, is placed over the release film 15 and a flexible vacuum bag 17 is mounted over the pad 116. The vacuum bag is formed of a suitably heat-resistant material having a thickness preferably on the order of 0.002 to 0.005 inch. The edges of the bag 17 are sealed to the outer edges of the tool surface 12 by a suitable adhesive sealant tape 20 of any well-known type. Accordingly, the part 14 and breather pad 116 are hermetically sealed from the exterior. A suitable vacuum valve connection 18 connects the interior of the bag 17 through a hose 201 to a suitable vacuum pump or other vacuum source (not shown).

In the curing operation, the assembly of FIG. 1 is placed in an autoclave (not shown). Air is evacuated from under the bag 17 by pulling vacuum there and the autoclave is heated to an appropriate temperature. The autoclave is also pressurized to assist in forcing the part 14 against the tool 11. During this process, while the material of part 14 is curing, all air, moisture and volatiles are forced out of it through the breather pad 116 and vacuum/vent line 201, enabling the part 14 to be void-free, with the desired properties, when cured.

After the curing step is completed, the vacuum bag, breather pad and release film 15 are removed and the finished part is separated from the tool surface.

Figure 4:
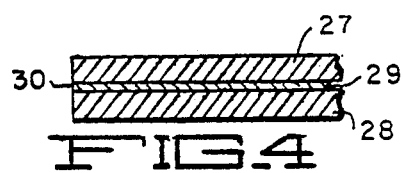
FIG. 4 is an enlarged fragmentary cross sectional view of a part comprising superposed metal sections with a layer of thermosetting adhesive therebetween.

Alternatively, as shown in FIG. 4, the part may comprise two superposed metal sections or laminates 27 and 28 with a layer 29 of a suitable thermosetting adhesive therebetween. In this case, evacuation of the bag 17 during the bonding step will withdraw air, moisture and volatiles from the adhesive layer 29 at its outer edges 30 to improve the adhesive quality of the layer. It will be noted that the sections 27 and 28 can also be formed of differing materials. For example, one section can be formed of metal and the other formed of a composite material.

Figure 3:
FIG. 3 is an enlarged cross sectional view, partly broken away, of the compacted fibers from the needle punch operation.
Figure 2:
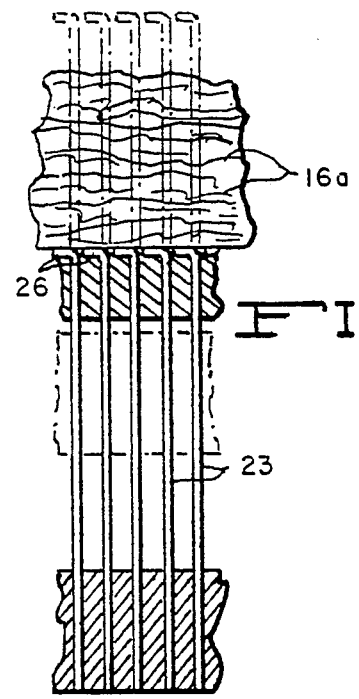
FIG. 2 is an enlarged cross sectional view, partly broken away, of a needle punch for compacting partially compressed nylon fibers into desired breather pad thickness for purposes of this invention.

FIG. 2 and 3 illustrate a needle punch operation for forming breather pad material in accordance with the present invention. As a first step, resilient nylon fibers 16a are bundled together in random directional orientation to form a bale. These fibers are preferably on the order of 0.0005 inch in diameter and may be formed from either virgin nylon or scrap nylon. The fibers are preferably from about two to about four inches in length. Alternatively, the nylon fibers may be mixed with up to 49% by weight of other fibers, such as fiberglass, polyester, or other suitable fibers, to yield a mixture suitable for purposes of the present invention.

In the process of forming the breather pad material of this invention, the bales of nylon, or nylon and other fibers, are shredded, then formed into appropriately thick beds of the fibers which are fed to a needle punch in which arrays of needles 23 with right-angled upper ends 26 are mounted to reciprocate up and down through the fiber bed to thereby intertwine and compact the fibers into appropriate breather pad thickness. See FIG. 2, which illustrates the needle action of the needle punch. FIG. 3 shows an enlarged segment of breather pad material from the needle punch operation. This material can be varied in thickness depending upon the individual requirements of specific curing operations. Individual breather pads are cut from rolls of the material as needed for such operations.

The formation of breather pads from bales of nylon fibers is equivalent to the known method of making breather pads from polyester fibers, and forms no part of the present invention, except insofar as the substitution of nylon fiber material for polyester fiber material is concerned. The actual steps of the needle punch operation itself are so well known as to require no further elaboration here.

In summary, the breather pad of this invention retains its shape during handling and springs back to somewhat the same shape after being compressed at a temperature below its melting point, typically from about 470° F. to about 480° F. It is thus sometimes usable for a number of curing operations, as opposed to polyester breather pads which always lose their resiliency when compressed at curing temperatures.

Typically representative of a nylon breather pad material in accordance with this invention is that available from AIRTECH International, Inc. of Carson, Calif. under the proprietary name Ultraweave. That product has a maximum use temperature of 450° F., and a melting point of 480° F. It is available in various weights and thicknesses. The weight, in oz. per square yard, of breather pad material directly affects its thickness. Typical thicknesses of the material can vary from as low as that represented by 4 oz. per square yard to that represented by 25 oz. per square yard.

Another nylon breather pad product is available from AIRTECH International, Inc. under the proprietary name Nylweave. This product has a maximum use temperature of 400° F. and a melting point of 420° F.

From the foregoing, it will be seen that I have provided a breather pad that will retain its porosity and resiliency over far greater temperature and pressure ranges than possible with the previously known polyester breather pads. Another advantage of my nylon breather pad over its polyester counterpart is a more uniformly consistent structure than that of the latter, in which some areas are thinner than others.

I claim:

1. A breather pad for use in the bonding and/or curing of a part comprising thermosetting composite resinous material or metallic and adhesive materials or a combination thereof in which said part is located between a forming tool and said breather pad and a vacuum bag is hermetically sealed over said breather pad and said part to enable a vacuum to be drawn to evacuate said vacuum bag and remove volatile substances from said part through said breather pad during said bonding and/or curing procedure, wherein said breather pad comprises a mass of fibers of nylon forming a resilient porous body having a thickness between that represented by a weight of about 4 ounces per square yard and that represented by a weight of about 25 ounces per square yard.

2. A breather pad as defined in claim 1 wherein said fibers are all of virgin nylon.

3. A breather pad as defined in claim 2 wherein said fibers are on the order of from 2 to 4 inches in length.

4. A breather pad as defined in claim 2 wherein said fibers are on the order of 0.0005 inch in cross-sectional diameter.

5. A breather pad as defined in claim 4 wherein said fibers are on the order of from 2 to 4 inches in length.

6. A breather pad as defined in claim 1 wherein said fibers are formed from scrap nylon.

* * * * *